United States Patent
Buzzi

(10) Patent No.: US 10,794,789 B2
(45) Date of Patent: Oct. 6, 2020

(54) METHOD AND MACHINE FOR BALANCING A VEHICLE WHEEL

(71) Applicant: Carlo Buzzi, Mandello Del Lario (IT)

(72) Inventor: Carlo Buzzi, Mandello Del Lario (IT)

( * ) Notice: Subject to any disclaimer, the term of this patent is extended or adjusted under 35 U.S.C. 154(b) by 0 days.

(21) Appl. No.: 16/653,273

(22) Filed: Oct. 15, 2019

(65) Prior Publication Data

US 2020/0041373 A1 Feb. 6, 2020

Related U.S. Application Data

(63) Continuation-in-part of application No. 15/427,727, filed on Feb. 8, 2017, now abandoned.

(30) Foreign Application Priority Data

Feb. 9, 2016 (IT) .................. 102016000013148

(51) Int. Cl.
| | | |
|---|---|---|
| *G01M 1/08* | (2006.01) | |
| *G01M 1/28* | (2006.01) | |
| *G01M 1/32* | (2006.01) | |

(52) U.S. Cl.
CPC .............. *G01M 1/08* (2013.01); *G01M 1/28* (2013.01); *G01M 1/326* (2013.01)

(58) Field of Classification Search
None
See application file for complete search history.

(56) References Cited

U.S. PATENT DOCUMENTS

| | | | |
|---|---|---|---|
| 4,357,832 A | 11/1982 | Blackburn | G01M 1/22 700/279 |
| 4,891,981 A | 1/1990 | Schonfeld | G01M 1/16 73/460 |
| 5,171,067 A | 12/1992 | Kawabe et al. | |
| 5,355,729 A | 10/1994 | Douglas | G01M 1/08 73/462 |
| 5,396,436 A | 3/1995 | Parker | G01M 1/225 700/279 |

(Continued)

FOREIGN PATENT DOCUMENTS

| | | |
|---|---|---|
| DE | 195 03 909 A1 | 8/1996 |
| EP | 1653210 | 5/2006 |

(Continued)

*Primary Examiner* — Natalie Huls
*Assistant Examiner* — Jermaine L Jenkins
(74) *Attorney, Agent, or Firm* — R. Neil Sudol; Henry D. Coleman

(57) ABSTRACT

A method for balancing a vehicle wheel includes mounting a wheel to be balanced on a rotating shaft of a machine computerized for measuring imbalances, and selecting an optimum commercial balancing weight which, when positioned on a correction plane, minimizes residual imbalance on reference planes of the wheel where the balancing tolerance is considered. One compares the residual imbalance value at the reference planes with the prescribed balancing tolerance after subtracting a vector of the static imbalance generated by the optimum balancing weight. An indicator device is activated to indicate on the wheel the optimum axial position of a correction plane for a balancing weight where the residual imbalance at the reference planes is within tolerance.

8 Claims, 3 Drawing Sheets

(56) References Cited

U.S. PATENT DOCUMENTS

| | | | |
|---|---|---|---|
| 5,915,274 A † | 6/1999 | Douglas | |
| 6,122,957 A | 9/2000 | Bux et al. | |
| 6,244,108 B1 † | 6/2001 | McInnes | |
| 6,484,574 B1 † | 11/2002 | Douglas | |
| 6,952,964 B2 | 10/2005 | Gerdes | G01M 1/02 73/459 |
| 7,191,650 B2 | 3/2007 | Cunningham | G01M 1/12 73/462 |
| 7,320,248 B2 † | 1/2008 | Douglas | |
| 7,658,108 B2 † | 2/2010 | Douglas | |
| 7,775,108 B2 * | 8/2010 | Montanari | G01M 1/225 73/457 |
| 8,169,604 B2 * | 5/2012 | Braghiroli | G01B 11/002 356/139.09 |
| 8,205,494 B2 * | 6/2012 | Nicolini | G01M 1/02 73/462 |
| 8,347,714 B2 * | 1/2013 | Matteucci | G01M 1/045 73/462 |
| 8,356,516 B2 * | 1/2013 | Montanari | G01M 1/02 73/462 |
| 8,359,921 B2 | 1/2013 | Oblizajek | G01M 1/225 73/460 |
| 8,553,213 B2 * | 10/2013 | Fishel | G01C 15/004 356/139.09 |
| 9,200,976 B2 * | 12/2015 | Ye | G01M 1/045 |
| 9,569,563 B2 * | 2/2017 | Estor | G01M 17/02 |
| 10,013,754 B2 * | 7/2018 | Douglas | G06T 7/0008 |
| 10,302,518 B2 * | 5/2019 | Montanari | G01M 1/16 |
| 2014/0165721 A1 | 6/2014 | Douglas | G01M 1/28 73/462 |

FOREIGN PATENT DOCUMENTS

| | | | |
|---|---|---|---|
| WO | WO 2013/190362 A1 | 12/2013 | |
| WO | 2019050799 A1 † | 3/2019 | |

\* cited by examiner
† cited by third party

METHOD AND MACHINE FOR BALANCING A VEHICLE WHEEL

CROSS-REFERENCE TO RELATED APPLICATION

The present application is a continuation-in-part of application Ser. No. 15/427,727 filed Feb. 8, 2017.

BACKGROUND OF THE INVENTION

The present invention relates to a method and to a machine for balancing a vehicle wheel.

As is known, the wheels of vehicles require frequent balancing operations, for example at each tire change or following abnormal wear of the tire.

The balancing operation consists in fitting small balancing weights, made of heavy material, on the wheel so as to compensate the imperfect distribution of the mass of the wheel with respect to its rotation axis, which by definition is the cause of the imbalance.

A rotating body is in fact defined as balanced when the geometric condition in which the rotation axis coincides with the centroid and main inertia axis is met.

Measurement of the imbalance is obtained by means of a balancing machine where the wheel is turned, after being fixed to a precision flange, so as to reproduce the fixing that is present on the car, i.e., so that the rotation axis of the wheel is the same that can be observed in conditions of operation.

By virtue of the rotation, the centrifugal forces generated by the imbalance occur on the balancing machine and are measured by sensors.

The machine is therefore capable of calculating the mass of the balancing weights which, placed on preset correction planes on the wheel and in given angular positions calculated by the instruments of the balancing machine, are capable of compensating the irregular distribution of the masses on the wheel, i.e., of balancing it.

The axial position of the correction planes and the radius at which the balancing weight must be fitted are preselected by the operator, who identifies, by means of adapted measurement devices, their positions with respect to the machine.

The above is well-known and documented in the prior art.

The balancing weights are fixed by means of steel springs to the outside of the wheel rims or, more frequently, by means of adhesive balancing weights to the inside of the rim. This last system is currently the preferred one due to aesthetic reasons, because the balancing weight is not visible, and for functional reasons, because there is no risk of losing the balancing weight, for example due to an accidental contact of the wheel with a sidewalk or other object.

Fastening the balancing weights inside the rim may be difficult because there is no certain reference that corresponds to the chosen correction plane used in the calculations by the machine. To avoid errors in fitting the balancing weight, some machines use more or less advanced indicator systems, such as laser indicator systems with a line or dot, as described for example in DE19503909, or mechanical systems that use the same arm used previously to measure the position of the correction plane, as described for example in EP1653210.

It should be noted that commercially available correction masses are of a standardized type with steps of 5 g or ¼ oz. Masses of lower value are rarely available. This entails a possible balancing error, because it may not be possible to perform the correction with the exact necessary value. On the other hand, there is a normally accepted tolerance for the balancing values of wheels, in view of the type of use and of the rotation rate in service. Simplifying, the tolerance of 7 or 5 g per plane (0.5 oz or 0.25 oz in the US) is normally adopted. The reference plans for evaluating the tolerance are normally the external planes of the wheel, i.e., the planes where spring-clip balancing weights can be fitted, which correspond to the edge of the wheel rim, and do not necessarily coincide with the planes on which the correction is made. In particular, they do not coincide with the planes inside the wheel rim when adhesive balancing weights are used. The topic in general is clearly detailed in ISO 21940.

The use of two balancing weights, one for each side, is the method normally used to balance a wheel. With two masses arranged in two different axial positions along a rotating body, and in particular a wheel, it is in fact generally possible to cancel both torque imbalances and static imbalance. Actually, it is well-known that static imbalance is the one that causes the greatest vibrations that are detectable for the driver. The normal tolerance criterion used generally and cited above, however, refers simply to a value per plane and does not provide a distinction of the type of residue, and therefore it is technically possible that the static residue on a wheel defined as balanced might be worth twice the residual per plane, when the residual values on the reference plans are substantially in step. This is a very clear error for the art but is normally not considered in practice in using wheel balancing machines. This apparent detail entails the possibility of poor balancing and unwanted vibrations on the vehicle when the two residues substantially in step, although per se within tolerance, generate an important static residue that however is not considered by the operator.

Many balancing machines are capable of indicating the value of the purely static imbalance. This is useful for balancing narrow wheels, for example motorcycle or car and truck wheels with low performance. However, the position along the axis of the wheel where the correction mass is to be placed is never indicated or prescribed, and therefore it is customary to place it in any axial position. The correction mass for static imbalance is in fact by definition the mass that is capable of bringing the center of gravity of the wheel on the rotation axis. This can be obtained by placing the mass in any axial position. The axial position of the mass, however, conditions the extent of the dynamic residual imbalance.

However, there is a very precise position along the rotation axis where static imbalance is to be corrected so that the residual dynamic imbalance is minimized. This position is not intuitive for the operator and is a result of a precise vector calculation that must be performed by the computer of the machine. U.S. Pat. No. 5,171,067 describes the associated calculation method.

OBJECTS OF THE INVENTION

The aim of the present invention is to provide a balancing method and machine that overcome the drawbacks of the cited prior art.

Within the scope of this aim, an object of the invention is to provide a balancing method that allows to more easily balance a good percentage of wheels, reducing the operations to be performed for the operator and thus saving time.

Another object of the invention is to provide a balancing method that allows a substantial reduction of static imbalance, ensuring a marked reduction in the vibrations induced on the vehicle.

A further object of the invention is to provide a balancing method that allows to use commercially available balancing weights.

Another object of the present invention is to provide a balancing apparatus that allows to balance vehicle wheels by using even just one balancing weight, minimizing static imbalance.

SUMMARY OF THE INVENTION

This aim and these and other objects that will become better apparent hereinafter are achieved by a method for balancing a vehicle wheel including the steps of:

mounting a wheel to be balanced on a rotating shaft of a machine that includes a computerized system for measuring imbalances, a system for measuring the distance and the diameter of the possible correction regions, an indicator device that is configured to indicate one or more correction positions within the wheel rim;

determining the axial position of the correction plane where a static balancing weight is to be located so as to minimize the imbalance on the reference planes of the wheel, where the residual imbalance is to be measured;

selecting an optimum commercial balancing weight which, when positioned on the correction plane, minimizes the residual imbalance on the reference planes where the balancing tolerance is considered;

comparing the residual imbalance value at the reference planes with the prescribed balancing tolerance after subtracting the vector of the static imbalance generated by the optimum balancing weight obtained above;

signaling to the operator the possibility to perform balancing with a single balancing weight if the residual imbalance at the reference planes is within tolerance; activating the indicator device in order to indicate on the wheel the optimum axial position calculated for the static balancing weight in the specific case.

BRIEF DESCRIPTION OF THE DRAWINGS

Further characteristics and advantages will become better apparent from the description of preferred but not exclusive embodiments of the invention, illustrated by way of non-limiting example in the accompanying drawings, wherein.

DETAILED DESCRIPTION

Figure 1:
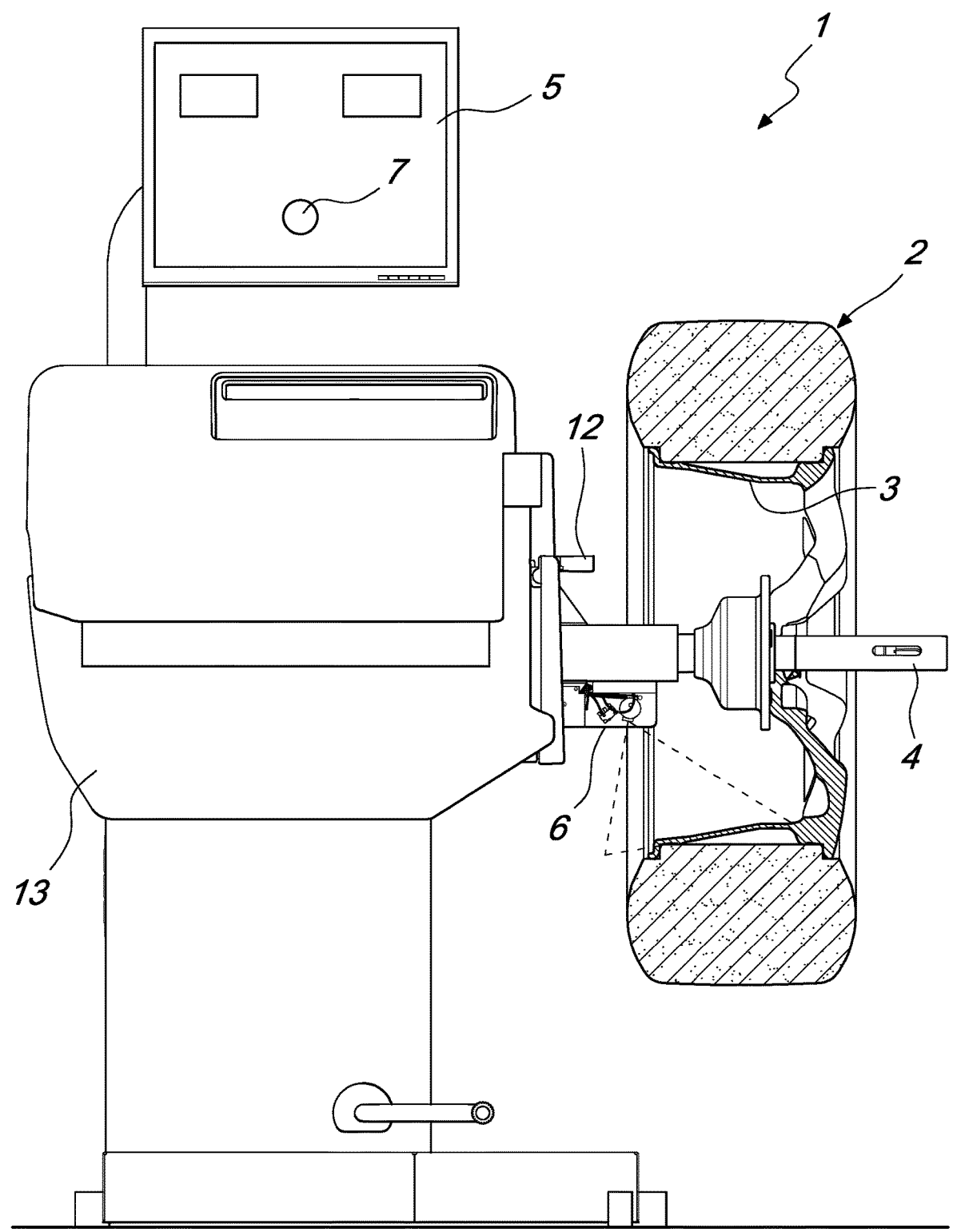
FIG. 1 is a partially cutout front view of a balancing machine according to the present invention.

With reference to the cited figures, the balancing machine according to the invention, designated generally by the reference numeral 1, includes a load-bearing structure 13 provided with a rotating shaft 4 which is extended outside the structure and is adapted to support and rotate a wheel to be balanced 2.

The machine 1 includes sensors for measuring vibrations and a computerized system for data processing and control.

The machine 1 also includes a system for measuring the positions of the planes and of the possible radii of correction, referred to the load-bearing structure 13, i.e., to the measurement transducers.

This allows the control system to transfer the imbalance values, read as signals equal to the forces measured by the sensors, to the corresponding correction planes.

The position measurement system can be, for example, a device with manual calibration, caliber, designated by the reference numeral 12, of the type described in EP1653210, or a device with automatic measurement of the profile of the wheel, of the type described in U.S. Pat. No. 6,122,957, by virtue of which the correction planes are determined automatically.

Preferably, the machine also includes devices for measuring the external dimensions of the wheel, in order to obtain the dimensional data that are useful for the correct calculation of the balancing residues referred to the external planes and not to the correction planes, according to the technical specification of the wheel manufacturers.

This means for measuring the external dimensions of the wheel can be constituted for example by a sonar sensor that is arranged on the protective housing of the machine, not visible in the figures, of the type described in IT1215026, and adapted to measure the axial position of the external plane of the wheel, where the spring-clip balancing weights can be placed.

This plane constitutes a reference for calculating the balancing tolerance, associated with the other internal plane of the wheel where the spring-clip balancing weights might be fitted.

The internal plane can be simply obtained with sufficient approximation by the measurement, taken with a gauge, of the plane where the internal adhesive balancing weight is to be placed.

The machine also includes an indicator device that is adapted to indicate an axial position of the balancing weight inside the wheel rim.

This position indication device can be for example an indicator 6 that is adapted to project a luminous dot, for example obtained by means of a laser, which is moved by an actuator of any kind so that the projected dot is visible inside the wheel rim 3.

The actuator can be linear or rotating or of another type.

Repetition of the predetermined axial position can be obtained also by virtue of a mechanical means, for example by using a device that is capable of locking in the correct position the measurement caliper used previously to measure the wheel, as described for example in EP1653210.

The indicator device described above can be activated at any time during the step in which the operator is searching for the correct angular position where the balancing weight is to be placed. For example, it can be always active, leaving to another mechanical, optical or acoustic system the indication of the angular position, or it can be activated only when the wheel is placed in the correct angular position in which the correction is to be performed.

Therefore, by virtue of the device adapted to indicate the axial position and of the device adapted to identify the angular position, it is possible to place the balancing weight in the exact position adapted to balance the wheel.

According to a preferred embodiment of the invention, the balancing of a wheel 2 occurs according to the following steps: mounting the wheel on the balancing machine, manually or automatically measuring the positions of the two adequate correction planes, optionally measuring the axial position of the external plane of the wheel in order to determine the correct reference plane for the tolerance, processing the measurements.

Once the imbalance data referred to the correction planes, or rather to the reference planes of the tolerance which are external to the wheel, have been obtained, the processing system calculates the static imbalance and the axial position of application of the static correction, such that the dynamic imbalance is minimized.

By performing a vector subtraction of the resulting static imbalance, assumed to be applied in the correct position, from the initial imbalance of the wheel, the residual imbalance at the reference planes is obtained.

When this imbalance is lower than the tolerance value it is technically possible to correct the wheel within the tolerance by using a single balancing weight arranged in the calculated position.

Since commercially available balancing weights have a mass which is only approximate with respect to any measured value, it is important to verify the result that can be obtained with correction values that are possible by using commercial balancing weights.

This entails the need to perform the calculation of the reference plane residue by approximating the value of the theoretical static imbalance with respect to the one that can be actually corrected with commercially available balancing weights.

It is then necessary to repeat the calculation of the residual imbalance at the planes with a static correction value that is over-approximated and a calculation with a balancing weight value that is under-approximated.

The minimum residue in the two cases is then verified and is to be compared with the tolerance. Consequently, in any case the static residue is smaller in extent than the weight step of commercially available balancing weights.

The figures show an example of embodiment of the machine according to the invention, which includes the load-bearing structure 13 provided with the rotating shaft 4, which is adapted to support a rim 3 of the wheel 2 to be balanced.

A control panel 5 is mounted on the load-bearing structure 13 and is provided with an operator interface.

The machine includes an axial position indication device 6, mounted on the load-bearing structure 13, which is adapted to project a luminous dot within the wheel rim 3.

The machine includes an extractable caliper 12, which can be used to measure the position of the correction planes with respect to the load-bearing structure 13.

Figure 2:
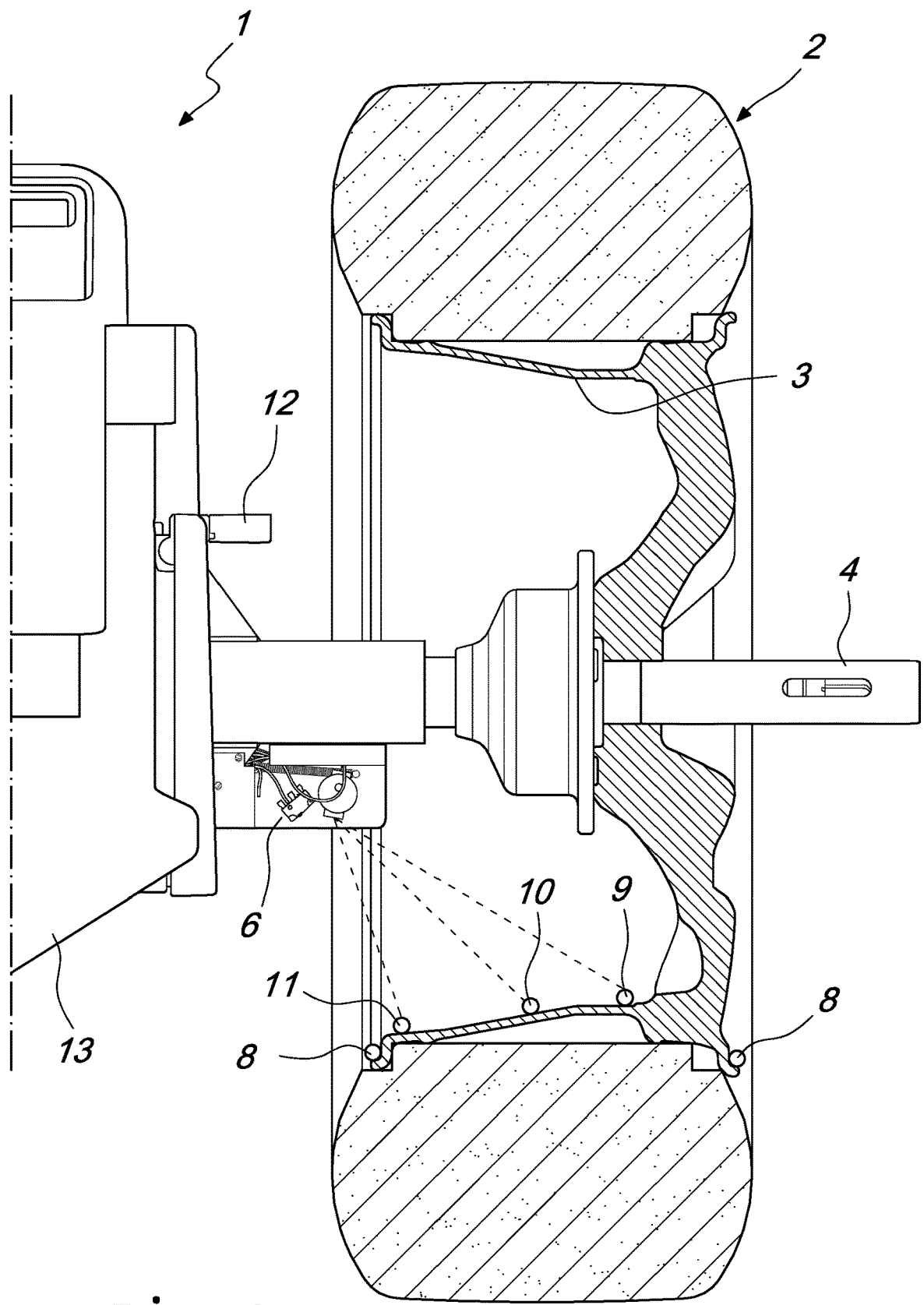
FIG. 2 is an enlarged view, with respect to the preceding figure, showing the wheel in cross-section.

FIG. 2 shows the planes 9 and 11 of possible correction within the wheel rim 3, a reference plane 8, for calculating the tolerance, and a plane 10, determined by virtue of the processing of the imbalance data and such that the static imbalance minimizes the imbalance at the reference planes.

Once the balancing measurement has been performed, the value and position of the plane of static imbalance 10 and the resulting dynamic residue are obtained.

When the value of the calculated residue is lower than the tolerance provided at the reference planes 8 or, optionally but less correctly, at the correction planes 9-11, an indicator 7 is activated on the panel 5 in order to warn the operator of the possibility to perform correction with a single balancing weight, as long as it is fitted at the plane 10.

This correction plane is indicated by the indicator 6.

The machine according to the present invention allows to use a single balancing weight and to obtain a lower static residue than normal balancing machines.

The correction radius measured for the two correction planes might not be identical and therefore the correction radius for static imbalance might not be predictable with certainty. In this case, it is necessary to determine the value of a correction radius for correct calculation of the value of the imbalance.

It is possible to adopt different methods to determine the value of the radius of the static correction point, for example by obtaining a linear interpolation line between the two different radii measured at the external planes of possible correction and by using the corresponding interpolated radius at the axial position of the static imbalance.

In machines with automatic measurement of the profile of the rim, this problem is solved by using the actually measured radius of the point of application of the static imbalance.

When the value of the residue calculated for both planes is within the values allowed for tolerance of the wheel, a signal is provided to the operator, indicating the possibility of correction on a single plane. This indication can be luminous, acoustic or in any case such as to be detectable for the operator. When the operator accepts to use this possibility, the machine indicates, by virtue of the indicator of the axial position, the exact position within the wheel rim where the balancing weight is to be mounted.

The tolerance value used, as described above, can refer as a first approximation to the planes of possible correction and as a second better approximation to the external planes of the wheel. The value itself can be reduced appropriately in order to take into account possible measurement errors of the machine or positioning errors of the balancing weight. This is appropriate in order to prevent the user, after correction with a single balancing weight, from still finding unacceptable imbalances at the reference planes due to small measurement errors or errors in the physical placement of the balancing weight. There is also a third approximation, based on the ISO2940 standard, for defining the tolerance values more accurately with respect to common practice, by considering parameters such as the mass of the wheel, the correction diameter, the ratio between the width and the diameter of the wheel, the rotation rate.

The results of this third approximation in general indicate the possible greater tolerance that is allowable for dynamic imbalance or torque imbalance with respect to static imbalance. These results can be used favorably in the method according to the present invention and in general increase the likelihood that a wheel can be balanced with a single balancing weight.

Figure 3:
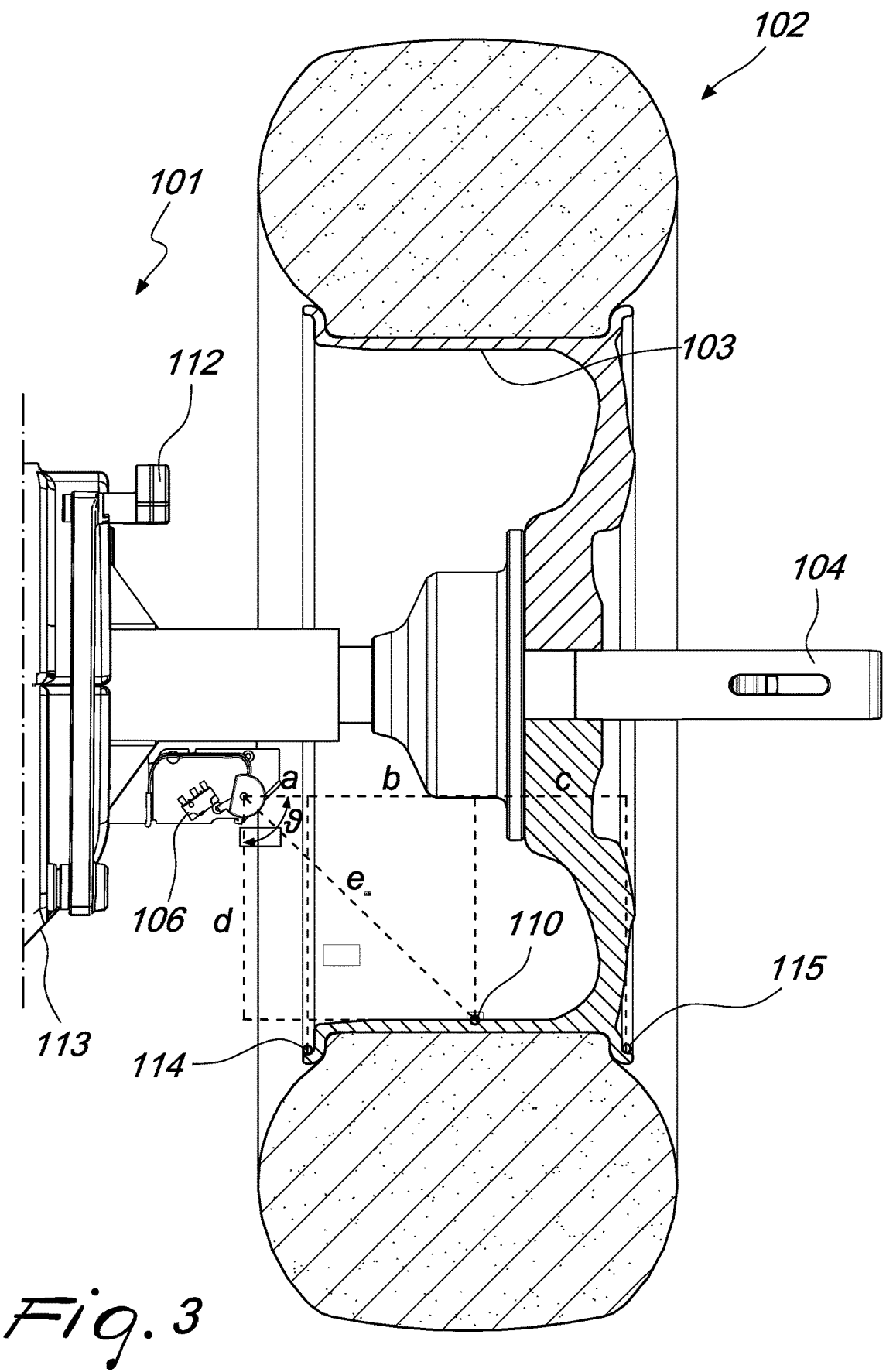
FIG. 3 is a front view of a balancing machine, according to the present invention, showing a wheel in cross-section.

FIG. 3 illustrates a balancing machine according to the invention, generally designated by the reference numeral 101, includes a load-bearing structure 113 provided with a rotating shaft 104 which extends outside the structure and is adapted to support and rotate a wheel 102 to be balanced.

The machine 101 includes sensors for measuring vibrations and a computerized system for data processing and control.

The machine 101 also includes a system for measuring the positions of the planes and of the possible radii of correction, referred to the load-bearing structure 113, i.e., to the measurement transducers.

This allows the control system to transfer the imbalance values, read as signals equal to the forces measured by the sensors, to the corresponding correction planes.

The position measurement system can be, for example, a device with manual calibration, caliber, designated by the reference numeral 112, of the type described in EP1653210, or a device with automatic measurement of the profile of the wheel, of the type described in U.S. Pat. No. 6,122,957, by virtue of which the correction planes are determined automatically.

Preferably, the machine also includes devices for measuring the external dimensions of the wheel, in order to obtain the dimensional data that are useful for the correct calculation of the balancing residues referred to the external planes and not to the correction planes, according to the technical specification of the wheel manufacturers, as described above.

According to the invention, the machine also includes an indicator device 106 which indicates an axial position of the balancing weight inside the wheel rim 103.

The indicator device 106 is a laser indicator having precise mechanical characteristics so that the projected dot is effectively on a straight line that contains the dot itself and intersects the rotation axis of the apparatus that provides the rotation.

Advantageously, as shown in FIG. 3, the laser device is mounted so that the emitter is positioned exactly at the rotation axis. This is convenient since the axial position indicated by the luminous dot on the rim must be a function of the angle of rotation of the indicator device.

The rotation can be provided, for example, by a precision stepper motor or with a similar motor system that allows a positioning accuracy better than 0.5 sexagesimal degrees.

FIG. 3 shows the variables that are used in the calculation.

The internal correction plane is indicated with the reference numeral 114 while the external correction plane is indicated with the reference numeral 115.

Also the following variables are defined:

b+c is the distance between the correction planes 114 and 115 with respect to which the residue is calculated;

a is the distance between the center of rotation of the indicator device 106 and the first correction plane 114;

d is the distance between the center of rotation of the indicator device 106 and the radial position of calculated and ideal correction of the static unbalance 110;

$\vartheta$ is the angle of rotation of the indicator device 106 to identify the correction point 110 of the static unbalance that minimizes the dynamic residue, illuminating the rim in direction e.

The axial position where the static unbalance minimizes the dynamic unbalance is given by the formula:

$$b = \frac{(b+c)}{2} - \frac{C_m \cdot (b+c) \cdot \cos(C_f - ST_f)}{ST_m}$$

where
$C_m$ is the module of vector $(\overline{S_{q_1}} - \overline{S_{q_2}})$
$ST_m$ is the module of vector $(\overline{S_{q_1}} + \overline{S_{q_2}})$
$C_f$ is the phase of vector $(\overline{S_{q_1}} - \overline{S_{q_2}})$
$ST_f$ is the phase of vector $(\overline{S_{q_1}} + \overline{S_{q_2}})$,
$\overline{S_{q_1}}$ e $\overline{S_{q_2}}$ are the vectors representing the imbalances calculated by the wheel balancer with respect to the correction planes 114 and 115, respectively.

The correlation between the angle of rotation of the indicator device and the axial position is:

$$\tan \vartheta = \left(\frac{a+b}{d}\right)$$

Therefore the rotation angle for the indication of the point of application of the static unbalance is:

$$\vartheta = \tan^{-1}\left(\frac{a+b}{d}\right)$$

This position can only be obtained from this relatively complex calculation, by means of the machine's computer, and is obviously not within the reach of the operator's intuition or practice.

The fact that a static imbalance placed in different axial positions can influence the dynamic residue is known from physics and is well known in the art.

However, the calculation performed by the machine's computer, in combination with the indication of the exact position inside the rim, provides the operator with an important procedural and practical aid.

The concept, known from U.S. Pat. No. 5,171,067, that an ideal position is there, certainly does not help the operator in practice.

On the contrary, the present invention provides the execution of a complex calculation and the indication with a luminous dot of the most convenient point of application of the weight and constitute an important and effective tool for the operator that executes the balancing process.

In practice it has been found that the invention achieves the intended aim and objects, providing a balancing machine that allows to balance a wheel by using a single balancing weight mounted in an adequate axial position.

Statistical data, on a sample of thousands of wheels, have indicated the possibility to balance within tolerance up to 30% of wheels.

The materials used, as well as the dimensions, may of course be any according to the requirements and the state of the art.

The invention claimed is:

1. A method for balancing a vehicle wheel, comprising the steps of
    mounting a wheel to be balanced on a rotating shaft of a machine that comprises a computerized system for measuring imbalances, a system for measuring distances and diameters of possible correction regions on the wheel for locating a static balancing weight, and, an indicator device that is configured to indicate one or more correction positions or locations within at least one of the possible corrections regions on said wheel for said static balancing weight;
    determining an axial position of a correction plane where a static balancing weight is to be located within at least one of the possible corrections regions on said wheel so as to minimize imbalance at one or more predetermined axial reference planes of the wheel, where residual imbalance is to be measured;
    selecting, as said static balancing weight, an optimum commercial balancing weight which, when positioned on said correction plane, minimizes the residual imbalance on the reference planes;
    comparing a residual imbalance value at the reference planes with a prescribed balancing tolerance after subtracting a vector of a static imbalance generated by the optimum commercial balancing weight;
    signaling to an operator the possibility to perform balancing with a single balancing weight if the residual imbalance at the reference planes is within the prescribed balancing tolerance; and
    activating said indicator device in order to indicate on the wheel the determined axial position for the optimum commercial balancing weight selected as the static balancing weight;
    said signaling being performed by a laser indicator device having an emitter projecting a luminous dot on an axial position on said rim; said axial position being a function of the angle of rotation of the indicator device;

said determined axial position being given by the formula:

$$b = \frac{(b+c)}{2} - \frac{C_m \cdot (b+c) \cdot \cos(C_f - ST_f)}{ST_m}$$

where
b+c is the distance between a first and a second correction planes with respect to which the residue is calculated;
a is the distance between the center of rotation of said indicator device and a first correction plane;
d is the distance between the center of rotation of said indicator device and the radial position of calculated and ideal correction of the static unbalance;
ϑ is the angle of rotation of said indicator device to identify a correction point of the static unbalance that minimizes the dynamic residue, illuminating the rim in a direction e
$C_m$ is the module of vector $(\overline{S_{q1}} - \overline{S_{q2}})$
$ST_m$ is the module of vector $(\overline{S_{q1}} + \overline{S_{q2}})$
$C_f$ is the phase of vector $(\overline{S_{q1}} - \overline{S_{q2}})$
$ST_f$ is the phase of vector $(\overline{S_{q1}} + \overline{S_{q2}})$,
$\overline{S_{q1}}$ e $\overline{S_{q2}}$ are the vectors representing the imbalances calculated by the wheel balancer with respect to two correction planes;
the correlation between said angle of rotation of said indicator device and the axial position being $$\tan \vartheta = \left(\frac{a+b}{d}\right)$$

the rotation angle for the indication of the point of application of the static unbalance being:

$$\vartheta = \tan^1\left(\frac{a+b}{d}\right).$$

2. The method according to claim 1, wherein a tolerance value used to signal the possibility of balancing with a single weight is different from a theoretical value in order to take into account any measurement or balancing weight positioning errors.

3. The method according to claim 1, wherein said reference planes to which the residual imbalance is to be referred are different from and located outside of the possible correction regions.

4. The method according to claim 1, wherein said reference planes coincide with possible correction planes located within the possible correction regions.

5. A machine for balancing a vehicle wheel, comprising a load-bearing structure provided with a rotating shaft adapted to support and rotate a wheel to be balanced;
a measuring means including vibration sensors for making measurements of regions of imbalance of said wheel;
a processing means for processing said measurements, said measurements comprising a measurement of an axial distance that is parallel to an axis of rotation of said wheel and a measurement of an angular value with respect to the axis of rotation of said wheel;
a laser indicator means for indicating at least one position on said wheel where a balancing weight is to be applied, said indicator means comprising an emitter that projects a luminous dot that is movable along a region of said wheel that is parallel to the axis of rotation of said wheel, said processing means providing an axial position of a static imbalance that minimizes the residual imbalance;
said laser indicator being mounted so that said emitter is positioned exactly at said axis of rotation, said axial position indicated by said luminous dot on said wheel being a function of an angle of rotation of said laser indicator, said rotation being provided by a motor system that allows a positioning accuracy better than 0.5 sexagesimal degrees.

6. The machine according to claim 5, wherein said wheel to be balanced comprises a wheel rim, said laser indicator indicating one or more correction positions inside said wheel rim.

7. The machine according to claim 6, wherein said laser indicator that moves said luminous dot along a region of said wheel rim that is parallel to the axis of rotation of said wheel.

8. The machine according to claim 5 further comprising devices for measuring external dimensions of the wheel.

* * * * *